(12) United States Patent
Lee et al.

(10) Patent No.: US 12,474,398 B2
(45) Date of Patent: Nov. 18, 2025

(54) TEST BOARD CAPABLE OF REGULATING TESTING TEMPERATURE OF SEMICONDUCTOR DEVICES

(71) Applicant: ATECO INC., Gunpo-si (KR)

(72) Inventors: Taek Seon Lee, Hwaseong-si (KR); Ho Nam Kim, Seongnam-si (KR)

(73) Assignee: ATECO INC., Gunpo-si (KR)

( * ) Notice: Subject to any disclaimer, the term of this patent is extended or adjusted under 35 U.S.C. 154(b) by 179 days.

(21) Appl. No.: 18/341,861

(22) Filed: Jun. 27, 2023

(65) Prior Publication Data

US 2024/0094283 A1 Mar. 21, 2024

(51) Int. Cl.
*G01R 31/28* (2006.01)

(52) U.S. Cl.
CPC ..... *G01R 31/2874* (2013.01); *G01R 31/2867* (2013.01)

(58) Field of Classification Search
CPC .. G01R 1/0458; G01R 31/26; G01R 31/2863; G01R 31/2867; G01R 31/2874; G01R 31/2889
See application file for complete search history.

(56) References Cited

U.S. PATENT DOCUMENTS

| | | | | |
|---|---|---|---|---|
| 6,668,570 B2 * | 12/2003 | Wall | .................... | G01R 31/2874 62/211 |
| 8,564,317 B2 * | 10/2013 | Han | .................... | G01R 31/2863 324/750.01 |
| 9,082,645 B2 * | 7/2015 | Takizawa | ........... | G01R 31/2886 |
| 11,828,795 B1 * | 11/2023 | Jones | .................. | G01R 31/2817 |
| 2021/0003631 A1 * | 1/2021 | Kim | .................... | G01R 31/2874 |
| 2022/0026485 A1 | 1/2022 | Kim et al. | | |

FOREIGN PATENT DOCUMENTS

| | | |
|---|---|---|
| JP | 64-6775 A | 1/1989 |
| JP | 2007-078388 A | 3/2007 |
| JP | 2008-170179 A | 7/2008 |
| JP | 2008-192485 A | 8/2008 |
| JP | 2009-053082 A | 3/2009 |
| JP | 2013-170926 A | 9/2013 |
| JP | 2013-234912 A | 11/2013 |
| KR | 10-2015-0085270 A | 7/2015 |
| KR | 10-2018-0028759 A | 3/2018 |
| KR | 10-2185035 B1 | 12/2020 |
| KR | 10-2021-0006787 A | 1/2021 |
| KR | 10-2021-0080047 A | 6/2021 |

* cited by examiner

*Primary Examiner* — Vinh P Nguyen

(57) ABSTRACT

A test board for semiconductor devices is provided which contains a plurality of semiconductor devices and is loaded into a testing apparatus. The test board includes: a receiving part formed with a plurality of semiconductor device receiving grooves that respectively receive a plurality of semiconductor devices; and a lid part removably attached to the receiving part, wherein the lid part includes a heat transfer portion having a first heat transfer end portion, which is exposed on the outside of the lid part while the lid part is attached to the receiving part, and a second heat transfer end portion, which extends from the first heat transfer end portion and is exposed to a temperature regulating region defined to include at least one of the plurality of semiconductor device receiving grooves.

16 Claims, 9 Drawing Sheets

TEST BOARD CAPABLE OF REGULATING TESTING TEMPERATURE OF SEMICONDUCTOR DEVICES

CROSS-REFERENCE TO RELATED APPLICATIONS

This application claims the benefit of Korean Patent Application No. 10-2022-0116803, filed on Sep. 16, 2022, the contents of which are all hereby incorporated by reference herein in their entirety.

BACKGROUND

Field

The present disclosure relates to a test board for testing semiconductor devices contained therein, and more particularly, to a test board to be loaded into a testing apparatus including a temperature regulator.

Related Art

With the recent increases in capacity and speed which are demanded in the field of semiconductor devices, various attempts are being made to mount larger-capacity memory in a small area and drive it efficiently. In line with this, research and development are being conducted to fabricate semiconductor devices having a three-dimensional structure, in order to improve the scale of integration of the semiconductor devices. Among them are semiconductor devices that adopt TSVs (through silicon vias), which are attracting attention. With these semiconductor devices having a three-dimensional structure, ultra-high-density design is made possible, and the length of connections between circuits can be reduced by using TSVs as a passage for the connections, which can bring many advantages such as higher signal speed and lower power consumption.

Since conventional testing apparatuses for testing semiconductor devices employ the method of pressing the devices directly or indirectly when performing a test, so as to bring the semiconductor devices into contact with a tester, the devices may be damaged if they are tested without packaging. To prevent this, a test board was proposed which is capable of minimizing impact on semiconductor devices during a testing process.

PRIOR ART DOCUMENT

Patent Document (Patent Document 1) Laid-Open Patent Publication No. 10-2015-0085270 (filed on Jul. 23, 2015).

SUMMARY

The present disclosure provides a test board where semiconductor devices diced into singulation dies are contained and loaded into a testing apparatus, which is able to regulate a testing temperature for a plurality of semiconductor devices contained therein.

A test board for semiconductor devices according to an exemplary embodiment of the present disclosure may include: a plurality of semiconductor device receiving grooves that respectively receive a plurality of semiconductor devices; and a lid part removably attached to the receiving part and including a heat transfer portion.

The heat transfer portion may include a first heat transfer end portion, which is exposed on the outside of the lid part while the lid part is attached to the receiving part, and a second heat transfer end portion, which extends from the first heat transfer end portion and is exposed to a temperature regulating region defined to include at least one of the plurality of semiconductor device receiving grooves.

The plurality of semiconductor device receiving grooves formed in the receiving part may be defined by a plurality of temperature regulating regions, and a plurality of heat transfer portions may be formed corresponding to the plurality of temperature regulating portions, respectively. The temperature regulating regions each may be defined to include one semiconductor device receiving groove.

The plurality of heat transfer portions may include a heat conductor extending from the first heat transfer end portion to the second heat transfer end portion. At least part of the second heat transfer end portion may come into contact with the semiconductor device received in the temperature regulating region while the lid part is attached to the receiving part, so as to regulate the temperature of the semiconductor device by heat conduction A plurality of temperature regulating regions may be formed and include a plurality of outer temperature regulating regions, which are defined to include at least one outer semiconductor device receiving groove formed on an outer part of the receiving part, and a plurality of inner temperature regulating regions, which are defined to include no outer semiconductor device receiving groove.

In order to uniformly regulate the plurality of semiconductor devices in both of the outer temperature regulating regions and the inner temperature regulating regions, the heat conductors corresponding to the outer temperature regulating regions and the heat conductors corresponding to the inner temperature regulating regions may be formed differently. For example, the length to the first heat transfer end portion may be shorter at the heat conductors in the outer temperature regulating regions than at the heat conductors in the inner temperature regulating regions. In another example, the mean cross-sectional area of a pathway from the first heat transfer end portion to the second heat transfer end portion may be larger at the heat conductors in the outer temperature regulating regions than at the heat conductors in the inner temperature regulating regions. In another example, the heat conductors in the outer temperature regulating regions may have a higher thermal conductivity than the heat conductors in the inner temperature regulating regions.

The heat conductors may have a larger cross-sectional area at the second heat transfer end portion than at the first heat transfer end portion.

The semiconductor test board may further include a plurality of temperature sensors in the semiconductor device receiving grooves, for measuring the temperatures of the semiconductor devices. A board temperature regulating portion may control the temperatures of the plurality of semiconductor devices individually based on temperature measurements from the temperature sensors.

The semiconductor test board may further include a circuit portion which forms a circuit for electrically connecting the semiconductor devices and a tester. The lid part may selectively press at least part of the receiving part, and the circuit portion may be selectively connected to the semiconductor devices in the receiving part at the pressed state by the lid part The receiving part may include a pocket unit formed with the semiconductor device receiving groove and a socket base configured in such a way that the pocket unit is movable relative thereto. When the lid part is attached to a top side of the receiving part, the lid part may press the pocket unit, and the position of the pocket unit may be changed, whereby the semiconductor device received in the pocket unit may be connected to the circuit portion.

The circuit portion may include a device contact terminal selectively connected to the semiconductor device received in the receiving part. Once the position of the pocket unit is changed by being pressed by the lid part, the device contact terminal may be exposed to the inside of the pocket unit and electrically connected to the semiconductor device. An elastic member may be provided between the socket base and the pocket unit such that the pocket unit is elastically supported on the socket base.

According to another embodiment of the present disclosure, the receiving part may further include a plurality of receiving part heat conductors each having a lid part contact portion at least partially coming into contact with the second heat transfer end portion while the lid part is attached to the receiving part and a semiconductor device contact portion coming into contact with the semiconductor device. The receiving part heat conductors may be included in the plurality of heat transfer portions, respectively, and may regulate the temperatures of the semiconductor devices by heat conduction, along with the heat conductors extending from the first heat transfer end portion to the second heat transfer end portion.

Alternatively, according to another embodiment of the present disclosure, the plurality of heat transfer portions each may include a heat transfer path extending from the first heat transfer end portion to the second heat transfer end portion. In this embodiment, a heat transfer medium may be supplied to the semiconductor device receiving groove in the temperature regulating region through the heat transfer path while the lid part is attached to the receiving part, so as to regulate the temperature of the semiconductor device by heat convection.

According to an embodiment disclosed in the present disclosure, a plurality of semiconductor devices may be controlled to a uniform temperature without being affected by the positions where they are received, since a test board includes a plurality of heat transfer portions corresponding to a plurality of temperature regulating regions.

Moreover, the plurality of semiconductor devices may be heated/cooled at a uniform rate by varying the length, cross-sectional area, and thermal conductivity of a heat transfer pathway depending on the positions of the heat transfer portions.

DESCRIPTION OF EXEMPLARY EMBODIMENTS

Figure 1:
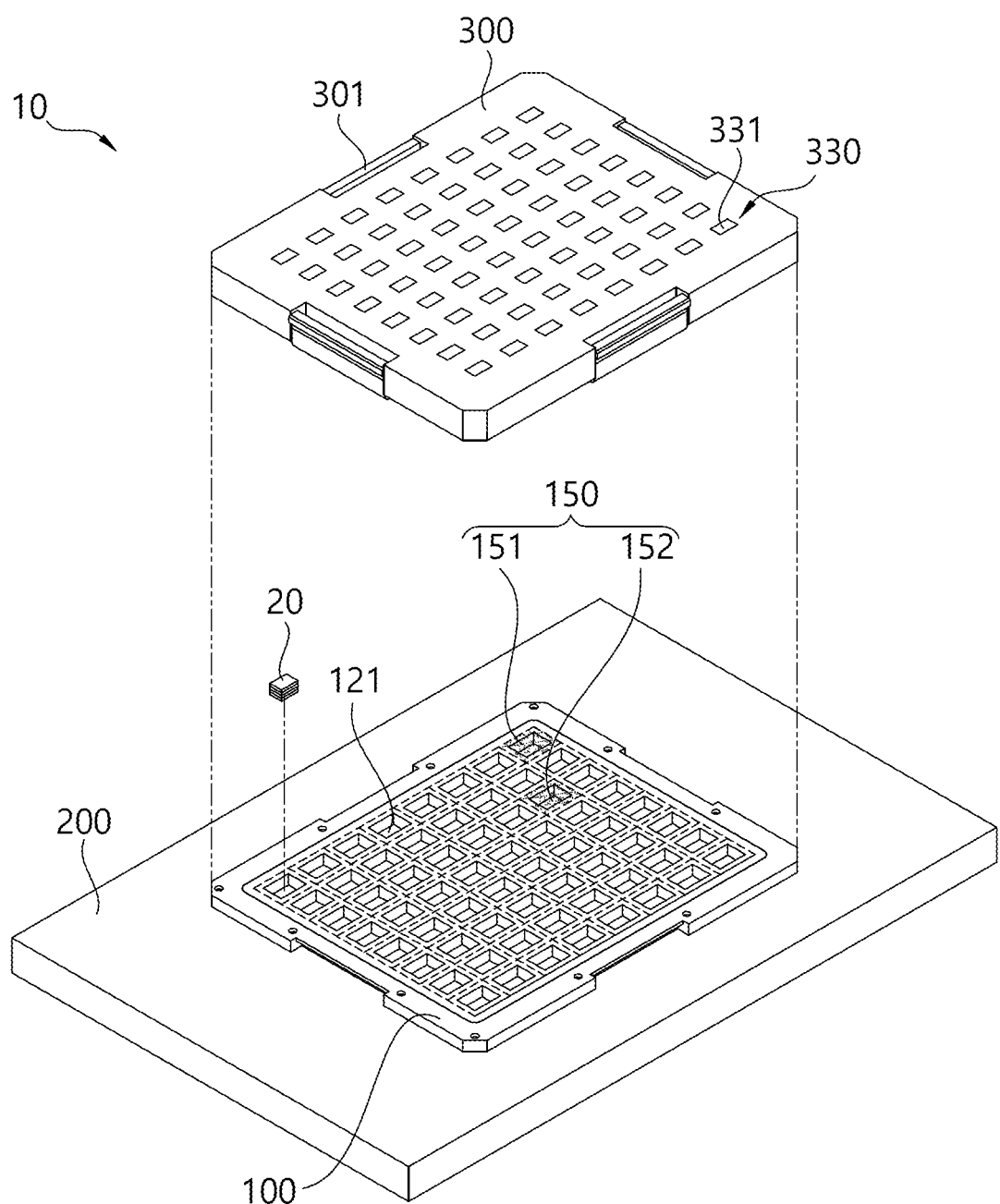
FIG. 1 is a perspective view illustrating a test board according to an embodiment of the present disclosure.

Hereinafter, a test board for semiconductor devices according to embodiments of the present disclosure will be described with reference to the drawings. The positional relationship between elements is described based on the drawings in principle. For convenience of description, the drawings may be simplified or exaggerated as necessary for illustrating the principles of the disclosure. However, the present disclosure is not limited to what is illustrated in the drawings, and other various devices may be added, modified or omitted.

In the following embodiments, the term "semiconductor device" may mean various semiconductor device elements. Although an embodiment of the present disclosure will be described with respect to a high bandwidth memory (HBM) based on through-silicon vias (TSVs) as an example, the present disclosure is not limited to this. Semiconductor devices manufactured by other methods may be included, and non-memory devices may be included as well as memory devices.

As used herein, what the expression "electrically connected" virtually means is not only "capable of carrying current" but also may be construed to mean that a connection path is formed to transmit an applied electrical signal.

Moreover, when a particular component is "connected to", "attached to", or "pressed by" another component, this may be construed to mean that the particular component is "connected", "attached", or "pressed" passively or in reaction to the another component's action, as well as being actively "connected", "attached", or "pressed".

Furthermore, when two different components are "connected", "attached", or "pressed" in an "electrical" or "mechanical" manner, this may be construed to mean that the two components are connected, attached, or pressed indirectly by the medium of an intervening component.

Hereinafter, a structure of a test board according to an embodiment of the present disclosure will be described concretely with reference to FIGS. 1 to 5.

FIG. 1 is a perspective view illustrating a test board according to an embodiment of the present disclosure. A test board 10 according to an embodiment of the disclosure is a component used in a process of testing a plurality of semiconductor devices 20. Here, the plurality of semiconductor devices 20 are singulation dies into which a stacked wafer structure is diced, which may be devices ready to be packaged. For example, the devices may be high bandwidth memory devices based on TSVs.

In conventional testing apparatuses, once a test board is loaded into a test chamber, the temperature in the test chamber is regulated to a testing temperature through a heater and/or blower installed on an inner wall of the chamber. However, such a temperature regulation method involves heating/cooling a space itself in the test chamber, and therefore the testing temperature may vary depending on where in the test board the semiconductor devices 20 are received. The test board 10 according to the embodiments of the present disclosure is configured such that the plurality of semiconductor devices 20 are controlled to a uniform temperature.

Specifically, referring to FIG. 1, the test board 10 according to an embodiment of this disclosure includes a receiving part 100 for receiving a plurality of semiconductor devices 20 and a lid part 300 removably fitted to a top side of the receiving part 100.

The receiving part 100 receives a plurality of semiconductor devices 20 in a plurality of semiconductor device receiving grooves 121 which are formed in an N×M array structure. The plurality of semiconductor device receiving grooves 121 formed in the receiving part 100 are partitioned to a plurality of temperature regulating regions 150 each including at least one semiconductor receiving groove 121. The plurality of temperature regulating regions 150 include a plurality of outer temperature regulating regions 151, which are defined to include at least one of outer semiconductor device receiving grooves formed on an outer part of the receiving part 100, and a plurality of inner temperature regulating regions 152, which are defined to include no outer semiconductor device receiving groove. Referring to FIG. 1, the plurality of temperature regulating regions 150 each may be defined to include one semiconductor device receiving groove 121.

The lid part 300 may be constructed of a plate-like structure that is attached to the top side of the receiving part 100. The lid part 300 may be attached to the top side of the receiving part 100 during a test process, and may protect received semiconductor devices 20 and prevent the semiconductor devices 20 from falling out, during transferring of and testing by the test board 10. A fastening structure 301 to be fastened to the receiving part 100 may be formed on an edge of the lid part 300 and attached in such a way as to be selectively removed according to the process steps. Although the lid part 300 of the embodiment illustrated in FIG. 1 is formed using a plate-like member with no opening, it may be formed with a plurality of openings so as to expose part of the received semiconductor devices 20.

The lid part 300 includes a heat transfer portion 330. The heat transfer portion 330 includes a first heat transfer end portion 331 exposed on the outside of the lid part 300 and a second heat transfer end portion 332 extending from the first transfer end portion 331 and exposed to the semiconductor device receiving groove 121. A plurality of heat transfer portions 330 may be formed to respectively correspond to the plurality of temperature regulating regions 150 defined on the receiving part 100. Referring to the embodiment illustrated in FIG. 1, the temperature regulating regions 150 each may be defined to include one semiconductor device receiving groove 121, and the heat transfer portions 330 may correspond in number to the number of semiconductor device receiving grooves 121, i.e., the number of semiconductor devices 20, so that the second heat transfer end portions 332 of the heat transfer portions 330 are exposed to the corresponding temperature regulating regions 150, respectively. The test board 10 having the plurality of heat transfer portions 330 is able to heat/cool the plurality of semiconductor devices 20 more evenly in comparison to a test board having a single heat transfer portion. In the case of a test board having a single heat transfer portion, it is necessary for the plurality of semiconductor devices to be heated/cooled collectively by the single heat transfer portion which has a large cross-sectional area. In this case, the larger the cross-sectional area of the heat transfer portion, the greater the difference in temperature between its inner and outer parts, which may result in variations in heating/cooling rate depending on where the semiconductor devices are received.

Meanwhile, the test board 10 according to an embodiment of this disclosure may further include a socket board 200. The socket board 200 may form the body of the test board 10, and the receiving part 100 may be fixed in place to an upper surface of the socket board 200. Referring to FIG. 1, the socket board 200 may be constructed of a plate-like member having a larger area than the receiving part 100 and the lid part 300. The fastening structure 301 of the lid part 300 may be configured to be fastened to the socket board 200. The area of the socket board 200 where the receiving part 100 is not fitted may form a portion that is pressed by a pushing unit so as to be electrically connected to a tester terminal at a test site (see FIG. 4). Such a socket board 200 may include a printed circuit board PCB, for example, and part of a circuit portion 400 to be described later may be formed on the socket board 200.

Figure 2:
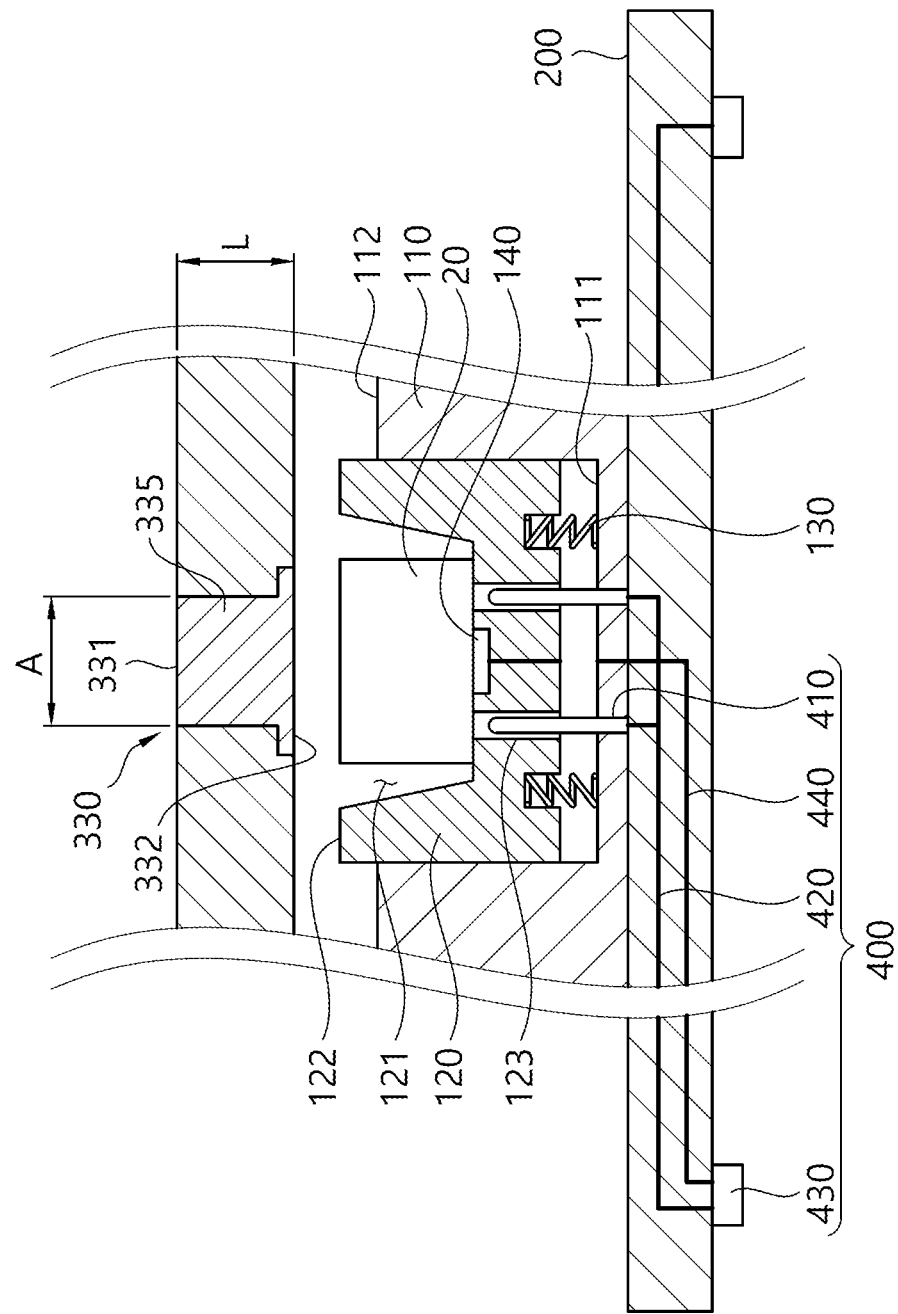
FIG. 2 is a cross-sectional view of a part of the test board shown in FIG. 1 where a semiconductor device is received.
Figure 3:
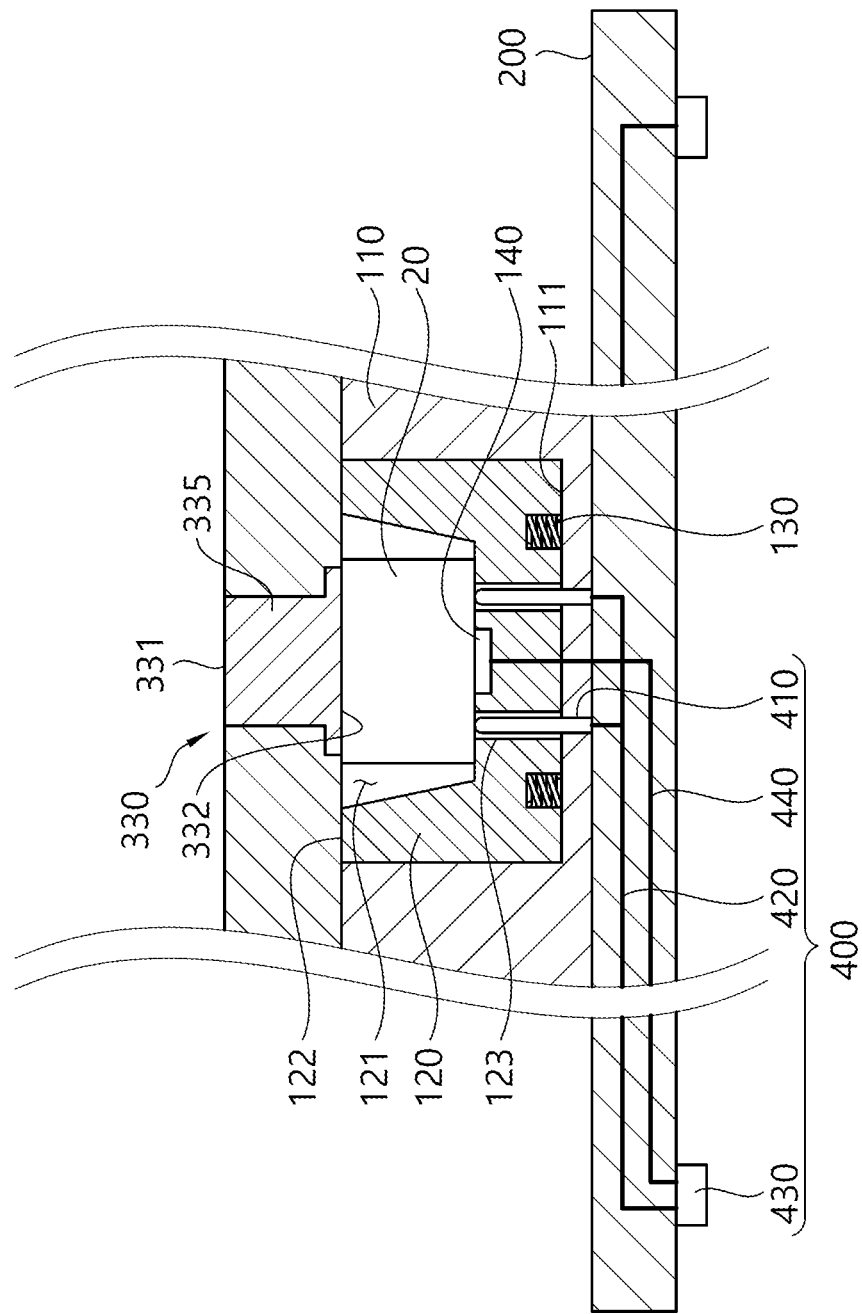
FIG. 3 is a cross-sectional view of the lid part shown in FIG. 2 fitted into place.

FIG. 2 is a cross-sectional view of a part of the test board 10 shown in FIG. 1 where a semiconductor device 20 is received. FIG. 3 is a cross-sectional view of the lid part 300 shown in FIG. 2 attached to the receiving part 100. Hereinafter, structures of the receiving part 100 and the lid part 300 will be described in detail with reference to FIGS. 2 and 3.

Specifically, the receiving part 100 may include a socket base 110 and a plurality of pocket units 120. The socket base 110 may include a plurality of recessed portions 111 fixed in place on the socket board 200, where the pocket units 120 are to be fitted. And, the plurality of socket units 120 each may be configured to be movable relative to the socket base 110, while being at least partially received in the recessed portions 111, and each pocket unit 120 may form a semiconductor device receiving groove 121 for receiving a semiconductor device 20.

The semiconductor device receiving groove 121 may be configured to be open at the top and to be surrounded by partition walls 122 of the pocket unit 120. Accordingly, the semiconductor device 20, while received in the semiconductor device receiving groove 121, may be supported by the bottom face of the pocket unit 120. The semiconductor device receiving groove 121 may be spaced a predetermined distance apart from each partition wall 122, with the semiconductor device 20 mounted on it. Consequently, it is possible to perform an operation of loading or unloading the semiconductor device 20 on or from the semiconductor device receiving groove 121. Specifically, the semiconductor device receiving groove 121 of the pocket unit 120 may be configured to have a tapering structure in which the cross-sectional area of the space becomes smaller gradually along the direction in which the semiconductor device 20 is inserted. In this case, the semiconductor device 20 may be easily inserted into an opening above the receiving space, and the inserted semiconductor device 20 may be easily guided to a mounting position on the bottom face of the pocket unit 120, and horizontal movement of the mounted semiconductor device 20 may be minimized. Accordingly, a lower part of the semiconductor device receiving groove 121 of the pocket unit 120 may have a tolerance of 5 to 15 μm while the semiconductor device 20 is received in it, and an upper part thereof may have a tolerance of 20 to 50 μm.

The receiving part 100 may be configured such that at least part thereof is pressed by the lid part 300 while the lid part 300 is attached to the top side. Referring to FIGS. 2 and 3, the receiving part 100 may be configured such that the lid part 300 presses the pocket unit 120 while the lid part 300 is attached to the receiving part 100. The pocket unit 120 may be configured to be vertically lifted from or lowered to the recessed portion 111 of the socket base 110, and, when the lid part 300 presses the pocket unit 120, the position of the pocket unit 120 may be changed. In this case, the pocket unit 120 may be elastically supported and fitted onto the socket base 110. For example, at least one elastic member 130 may be provided between the recessed portion 111 of the socket base 110 and the bottom face of the pocket unit 120. Accordingly, it is possible to mitigate any impact generated when the semiconductor device 20 is received in the pocket unit 120 or when the pocket unit 120 is pressed by the lid part 300.

Specifically, the heat transfer portion 330 of the lid part 300 may include a heat conductor 335 extending from the first heat transfer end portion 331 to the second heat transfer end portion 332. Referring to the embodiment illustrated in FIGS. 2 and 3, the heat transfer portion 330 as a whole may be a single heat conductor 335. Alternatively, at least part of the heat transfer portion 330 may be formed of a heat conductor 335. Referring to FIG. 3, while the lid part 300 is attached to the receiving part 100, at least part of the second heat transfer end portion 332 may come into contact with the semiconductor device 20 received in the semiconductor device receiving groove 120. In the test chamber, a board temperature regulating portion 1425 may come into contact with the outside of the lid part 300 and regulate the temperatures of the semiconductor devices 20 received in the test chamber (see FIG. 4). In this case, the temperatures of the semiconductor devices 20 are regulated by heat conduction using the heat conductor 335. Since the board temperature regulating portion 1425 and the semiconductor devices 20 are in contact with the first heat transfer end portion 331 and second heat transfer end portion 332 of the heat conductor 335, respectively, the semiconductor devices 20 are heated/cooled through a heat conduction pathway from the first heat transfer end portion 331 to the second heat transfer end portion 332.

In the embodiment illustrated in FIG. 1, since the semiconductor device receiving groove 121 is arranged in an N×M array structure in the receiving part 100, the temperature regulating regions 150, which are defined in such a way that each includes one semiconductor device receiving groove 121, also are arranged in an N×M array structure. In this case, each inner temperature regulating region 152 is surrounded on four sides, i.e., two sides along the row direction and two sides along the column direction, by another temperature regulating regions 150, whereas at least one side of each outer temperature regulating region 151 is contiguous to the edge of the receiving part 100, whereby heat can be emitted to the outside during a temperature regulating process. Thus, there may be variations in heating/cooling rate between the outer temperature regulating regions 151 and the inner temperature regulating regions 152. Accordingly, the plurality of semiconductor devices 20 may be evenly heated/cooled regardless of the positions where they are received, by varying the shape or material of the heat conductors 335 depending on whether they correspond to the outer temperature regulating regions 151 or the inner temperature regulating regions 152.

For example, in heat conduction, heat transfer rate is inversely proportional to the length of the heat conduction pathway. In this embodiment, the length of the heat conduction pathway corresponds to the length L from the first heat transfer end portion 331 to the second heat transfer end portion 332. Accordingly, the plurality of semiconductor devices 20 may be heated/cooled at a uniform rate regardless of the positions where they are received, by forming the heat conductors 335 in such a way that the length L from the first heat transfer end portion 331 to the second heat transfer end portion 332 is shorter in the outer temperature regulating regions 151 than in the inner temperature regulating regions 152.

Alternatively, for example, heat transfer rate is proportional to the cross-sectional area of the heat conduction pathway. In this embodiment, the cross-sectional area of the heat conduction pathway corresponds to the cross-sectional area A of the direction of the pathway from the first heat transfer end portion 331 to the second heat transfer end portion 332. Accordingly, the plurality of semiconductor devices 20 may be heated/cooled at a uniform rate regardless of the positions where they are received, by forming the heat conductors 335 in such a way that the mean cross-sectional area A of the pathway from the first heat transfer end portion 331 to the second heat transfer end portion 332 is larger in the outer temperature regulating regions 151 than in the inner temperature regulating regions 152.

Alternatively, for example, heat transfer rate is proportional to the thermal conductivity of a material of which the heat conductor 335 is formed. Accordingly, the plurality of semiconductor devices 20 may be heated/cooled at a uniform rate regardless of the positions where they are received, by forming the heat conductors 335 of a material of higher thermal conductivity in the outer temperature regulating regions 151 than in the inner temperature regulating regions 152.

The heat conductors 335 may be formed in such a way that the cross-sectional area at the second heat transfer end portion 332 is larger than the cross-sectional area at the first heat transfer end portions 331. With this shape, the heat conductors 335 allow the second thermal end portion 332 to come into contact with the semiconductor device 20 over a larger area, and therefore heat transferred from the first heat transfer end portion 331 may be transferred more uniformly across the semiconductor device 20 through the second heat transfer end portion 332. The shape of the heat conductors 335 is not limited to the embodiment illustrated in FIGS. 2 and 3, and, for example, they may be tapered from the first heat transfer end portion 331 to the second heat transfer end portion 332.

The test board 10 may include a circuit portion 400 which forms a path through which the semiconductor devices 20 and a tester are electrically connected. The circuit portion 400 may include a plurality of semiconductor device contact terminals 410, a plurality of tester contact terminals 430, and a device contact circuit 420 which forms a path through which the semiconductor device contact terminals 410 and the tester contact terminals 430 are electrically connected. Specifically, the semiconductor device contact terminals 410 are components that are electrically connected through contact with their respective semiconductor devices 20, and may correspond in number to the number of semiconductor devices 20 to be received. Since the position of the pocket unit 120 is changed as the lid part 300 is fitted in place, the device contact terminals 410 may be electrically connected to the received semiconductor devices 20, respectively. Meanwhile, the tester contact terminals 430 are components that are electrically connected to tester terminals 1422 during testing, and may be formed on an outer surface of the test board 10 so as to allow direct access from the outside. Accordingly, once the lid part 300 is attached after the plurality of semiconductor devices 20 are contained in the test board 10, the test board 10 and a tester 1421 are connected without additional external force applied to the semiconductor devices 20, thus making it possible to perform testing.

Moreover, the receiving part 100 may include a temperature sensor 140 for measuring the temperature of the semiconductor device 20. For example, in the embodiment illustrated in FIGS. 2 and 3, the temperature sensor 140 may be fitted to the bottom face of the pocket unit 120 to measure the temperature of the received semiconductor device 20 which lies over it. Temperature information on the semiconductor device 20 measured by the temperature sensor 140 may be transmitted to the board temperature regulating portion 1425 through a temperature sensor circuit 440 electrically connected to the tester contact terminal 430. The temperature sensor circuit 440 may be formed across the receiving part 100 and the circuit portion 400, and may be electrically connected while the lid part 300 is attached to the receiving part 100. A plurality of temperature sensors 140 may be formed corresponding to the plurality of semiconductor devices 20, respectively, and are able to measure the temperatures of the plurality of semiconductor devices 20, respectively. The board temperature regulating portion 1425 may include a controller, and the controller may control the temperatures of the plurality of semiconductor devices 20 individually based on temperature measurements from the temperature sensor 140.

Meanwhile, referring to FIGS. 2 and 3, the semiconductor device contact terminal 410 forming one end of the circuit portion 400 may be provided in the form of a connecting pin that protrudes upward from the bottom face of the socket base 110. Also, at least one through-hole 123 may be formed through the bottom face of the pocket unit 120, and the semiconductor device contact terminal 410 may be inserted into place by passing through the through-hole 123. Accordingly, the semiconductor device contact terminal 410 may be selectively exposed to the inside of the receiving space depending on the position of the pocket unit 120 and electrically connected to the semiconductor device 20.

A plurality of semiconductor device contact terminals 410 may be provided so as to be connected to the respective semiconductor devices 20 received in the receiving part 100, and may be fitted to the respective pocket units 120. Also, the semiconductor device contact terminals 410 may be electrically connected to the respective tester contact terminals 430 which are exposed to a lower side of the socket board 200 by means of the circuit formed on the socket board 200.

In the test board 10 according to this embodiment, since the semiconductor device 20 is fixed in place while the lid part 300 and the receiving part 100 are attached, the semiconductor device 20 and the circuit portion 400 of the test board may be electrically connected. In this case, the structure for elastically supporting the pocket unit 120, the pocket unit 120 itself, and the portion pressing the pocket unit 120 may be constructed of a buffer material to minimize the impact on the semiconductor device 20. Also, the plurality of semiconductor devices 20 to be tested may be embedded in the test board 10 and transferred to the test site while protected, and testing may be performed by using the tester contact terminals 430 of the test board 10 without applying additional external force to the semiconductor devices 20, thus making it possible to carry out various tests without damaging the semiconductor devices 20.

Here, the test board 10 is exposed to an environment with a wide temperature variation range since testing is conducted in a considerably high-temperature testing environment. Accordingly, it is desirable that the pocket unit 120, the socket base 110, etc. which constitute the receiving part 100 are constructed of a material such as ceramic that has a similar thermal expansion coefficient to the material of the semiconductor devices 20. Furthermore, the heat transfer portion 330 of the lid part 300 and other parts thereof also may be manufactured using a material that has a similar thermal expansion coefficient to the material of the semiconductor devices 20, in consideration of such a temperature changing environment.

Although the foregoing description has been given with respect to an example of the test board 10 according to the present disclosure, the embodiments of the present disclosure are not limited to this. The structure of the test board 10 may be modified in various ways by configuring the test board 10 to support the semiconductor devices 20 within it and controlling the temperatures of the semiconductor devices 20 individually while the lid part 300 and the receiving part 100 are attached.

Figure 4:
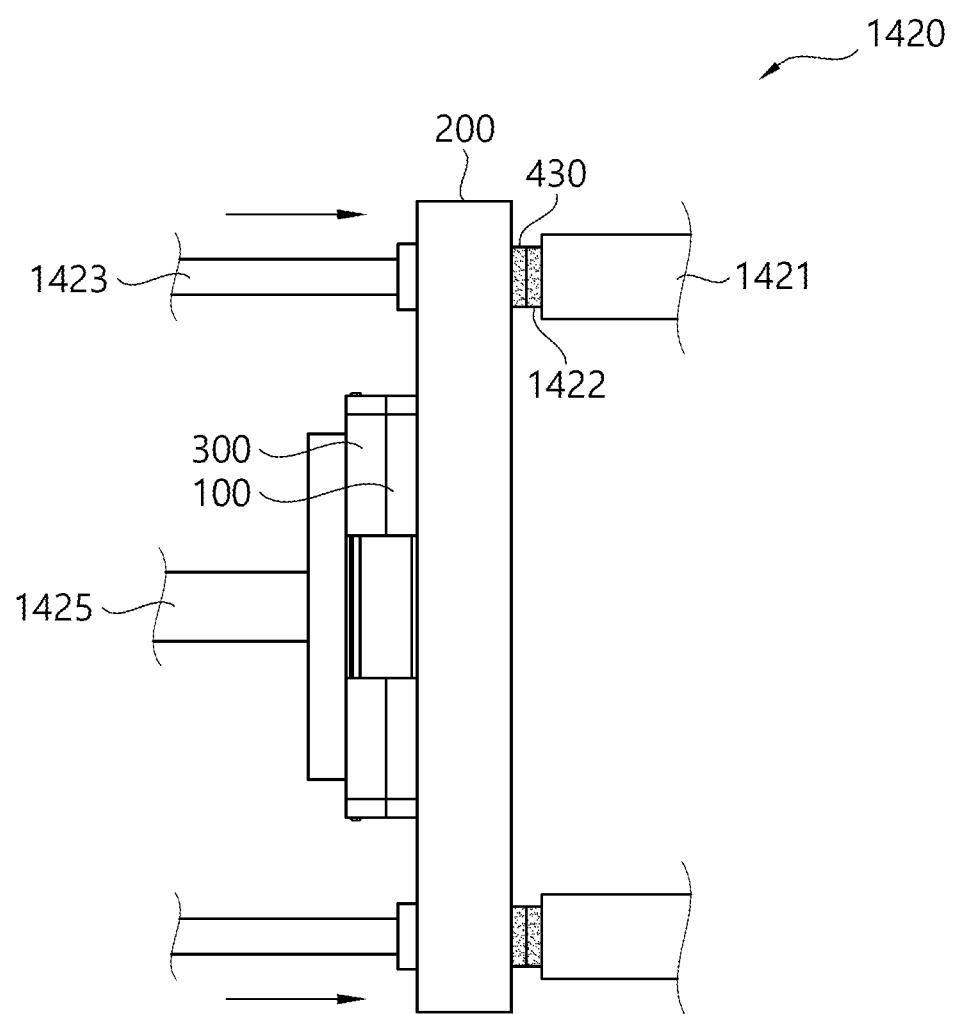
FIG. 4 is a view illustrating part of the configuration of the test chamber.

Hereinafter, a method of regulating the temperature of the test board 10 within a test chamber 1420 of a testing apparatus according to an embodiment of the present disclosure will be described with reference to FIG. 4. The temperature of an inner space in the test chamber 1420 may be regulated to suit a preset testing environment by using the board temperature regulating portion 1425, and once the test board 10 is inserted, the semiconductor devices 20 may be tested using the tester 1421. The tester chamber 1420 may include the board temperature regulating portion 1425 for regulating the temperature in the chamber to suit a preset testing environment. As described above, the board temperature regulating portion 1425 may control the temperature of the test board 10 by selectively coming into contact with the test board 10. Referring to FIG. 4, the board temperature regulating portion 1425 is able to regulate the temperatures of the semiconductor devices 20 by heat conduction by partially coming into contact with an upper surface of the lid part 300 of the test board 10. This method allows for direction control of the temperatures of the semiconductor devices 20, as opposed to a conventional method in which the temperatures of the semiconductor devices 20 are indirectly controlled by heating/cooling the test chamber 1420, thereby making it possible to adjust the temperatures of the semiconductor devices 20 more precisely to a preset testing temperature. Moreover, as stated previously, the plurality of semiconductor devices may be defined by the plurality of temperature regulating regions 150 so that their temperatures are regulated individually. Therefore, temperature control may be performed in a way that compensates for temperature variations or heating rate variations that may occur depending on the positions where the semiconductor devices 20 are received.

Meanwhile, referring to FIG. 4, pushing units 1423 of the test chamber 1420 may press an upper surface of the socket board 200 of the inserted test board 10 where the receiving part 100 is not present, and accordingly the test contact terminals 430 of the test board 10 and the terminals 1422 on the tester side may be electrically connected through contact. Although FIG. 4 illustrates that two tester contact terminals 430 are provided on the tester board 10 and connected to the tester 1421 for convenience of explanation, more tester contact terminals 430 may be provided depending on the design of the circuit portion 400.

While conventional test chambers do not have enough space in them since they are designed to press every semiconductor device individually, an embodiment of this disclosure provides more inner space by compactly configuring the pushing units 1423 or the like. Thus, a heater and/or blower may be further included as a supplementary means to be installed on an inner wall of the test chamber 1420, in addition to the above-described board temperature regulating portion 1425.

Figure 5:
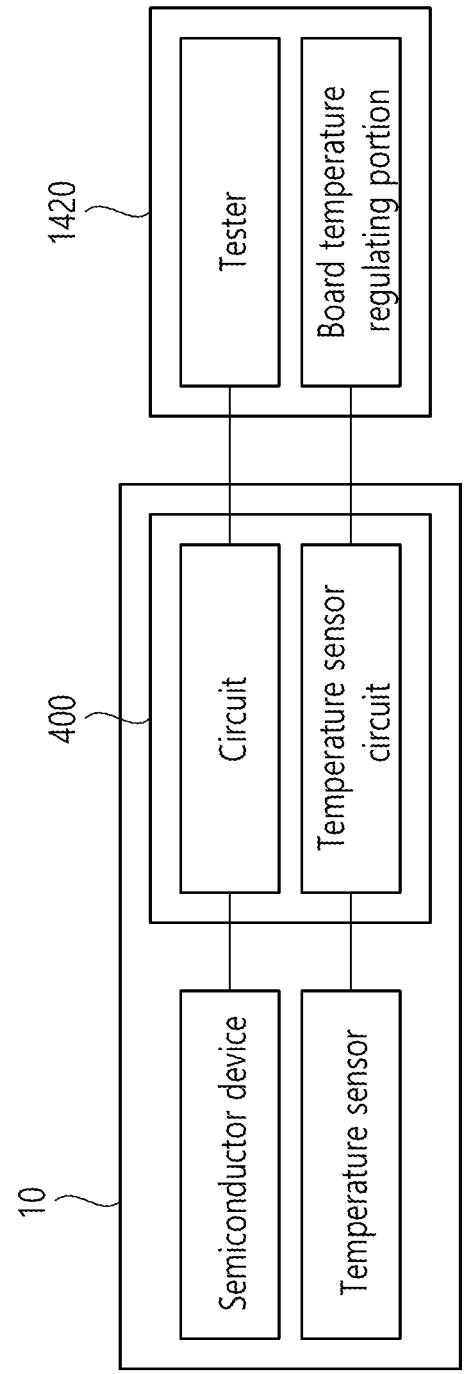
FIG. 5 is a block diagram about the test board and test chamber according to an embodiment of the present disclosure.

Hereinafter, a structure of the test board 10 which is different from that of the foregoing embodiment will be described with reference to FIG. 5. However, it should be noted that detailed descriptions of components equivalent to those of the foregoing embodiment and similar technical details will be omitted to avoid redundant explanation.

Figure 6:
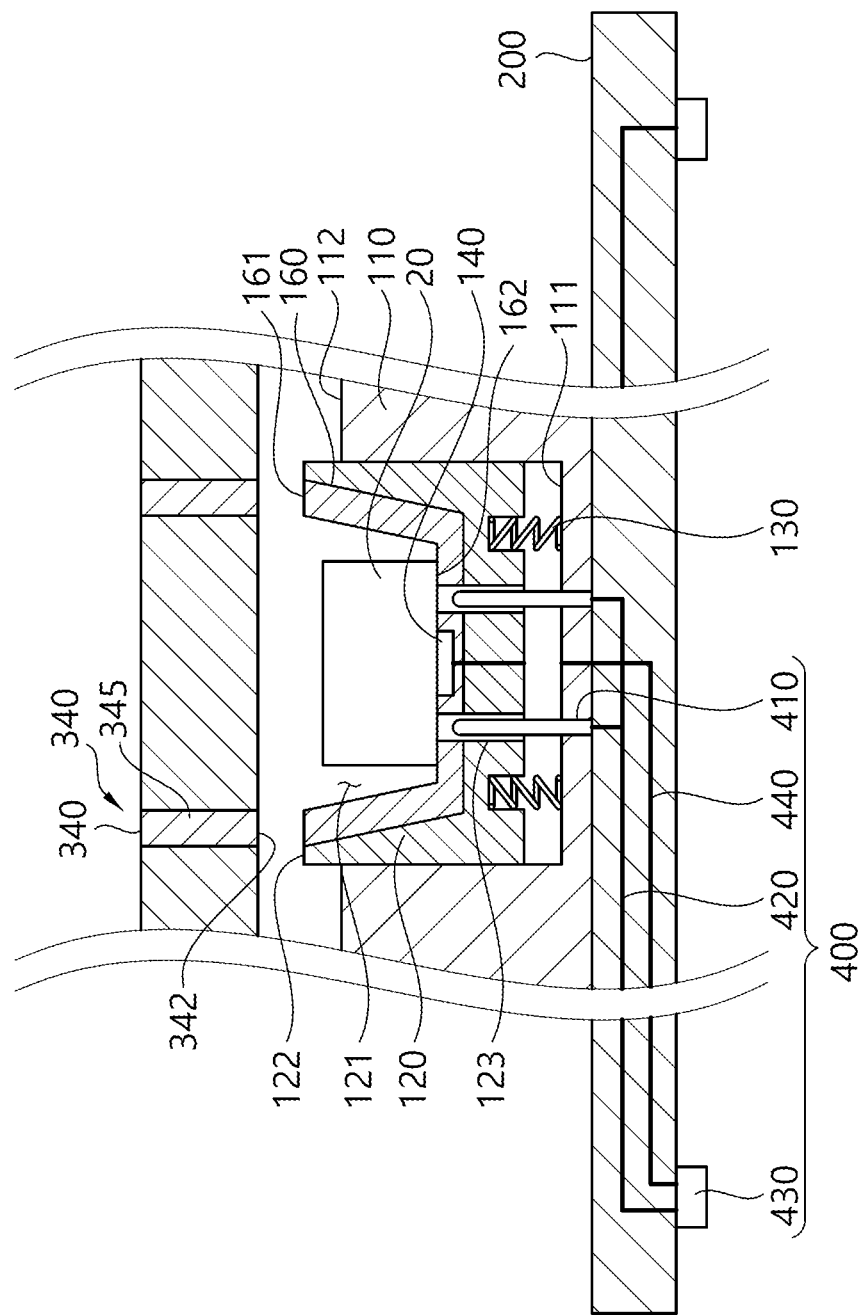
FIG. 6 is a cross-sectional view of a part of the test board according to another embodiment of the present disclosure.

FIG. 6 is a cross-sectional view of a part of the test board 10 according to another embodiment of the present disclosure. In another embodiment illustrated in FIG. 6, the pocket unit 120 containing the semiconductor device 20 may further include a receiving part heat conductor 160. The receiving part heat conductor 160 may include a lid part contact portion 161 at least partially coming into contact with the second heat transfer end portion 342 of the heat transfer portion 340 while the lid part 300 is attached to the receiving part 100, and a semiconductor device contact portion 162 at least partially coming into contact with the semiconductor device 20. The lid part contact portion 161 and the semiconductor device contact portion 162 are connected by at least one heat conductor, thereby forming a heat transfer pathway that runs from the lid part contact portion 161 to the semiconductor device contact portion 162.

In the foregoing embodiment, the heat conductor 335 of the lid part 300 comes into direct contact with the semiconductor device 20 while the lid part 300 is attached. Thus, heat is exchanged directly between the heat conductor 335 of the lid part 300 and the semiconductor device 20. In contrast, in the embodiment illustrated in FIG. 6, even though the semiconductor device 20 and the heat conductor 345 do not make direct contact with each other, the heat conductor 345 of the lid part 300 comes into direct contact with the receiving part heat conductor 160, thereby forming a heat transfer pathway leading to the semiconductor device 20 and, as a result, enabling heat exchange between the board temperature regulating portion 1425 and the semiconductor device 20.

Hereinafter, a structure of the test board 10 which is different from that of the foregoing embodiment will be described with reference to FIG. 7. However, it should be noted that detailed descriptions of components equivalent to those of the foregoing embodiment and similar technical details will be omitted to avoid redundant explanation.

Figure 7:
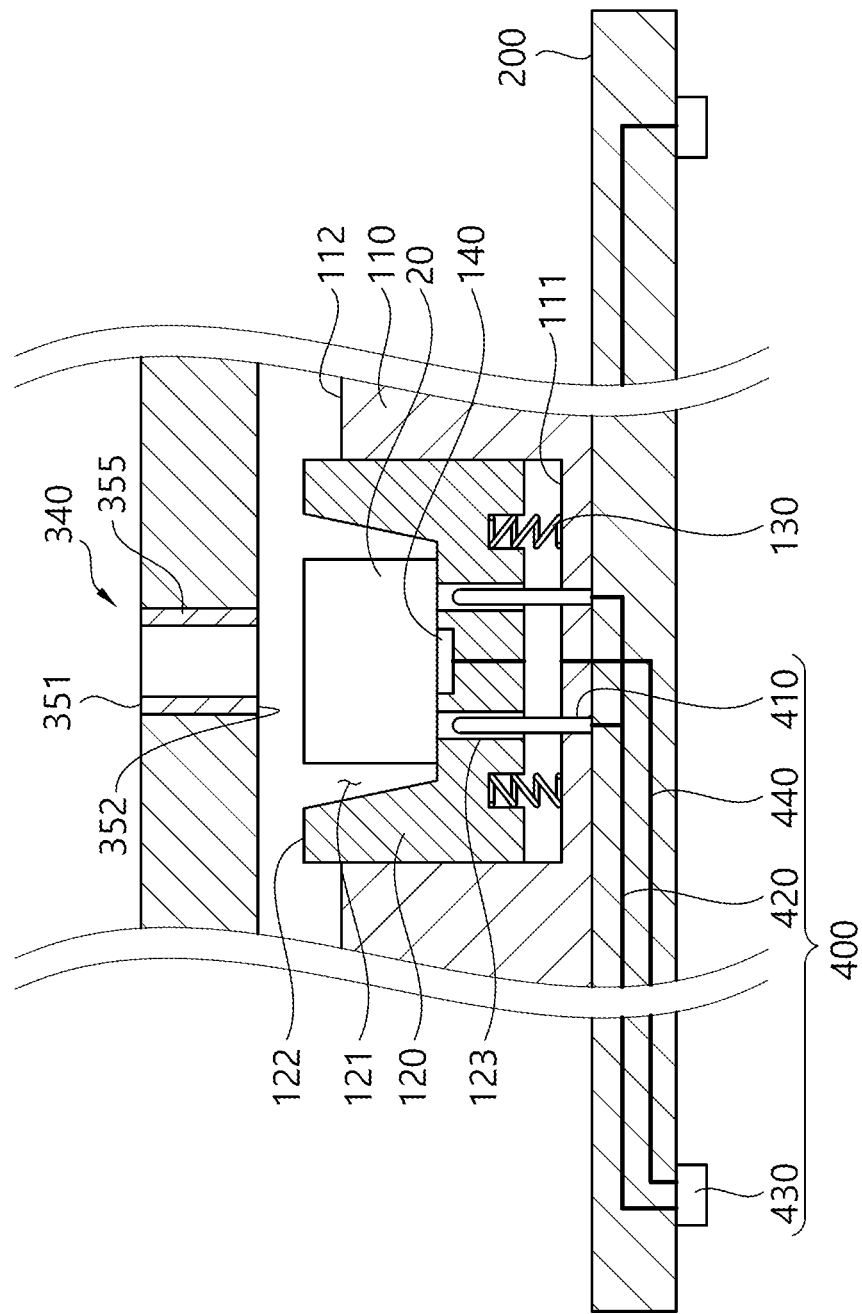
FIG. 7 is a cross-sectional view of a part of the test board according to another embodiment of the present disclosure.

FIG. 7 is a cross-sectional view of a part of the test board 10 according to another embodiment of the present disclosure. In another embodiment illustrated in FIG. 7, a heat transfer portion 340 including a heat transfer path 355 is formed. The heat transfer path 355 extends from the first heat transfer end portion 351 exposed on the outside of the lid part 300 to the second heat transfer end portion 352 exposed to the semiconductor device receiving groove 121 included in the temperature regulating region 150. A heat transfer medium is supplied to the semiconductor device receiving groove 121 in the temperature regulating region 150 through the heat transfer path 355 while the lid part 300 is attached to the receiving part 100, and the heat transfer medium heats/cools the semiconductor device 20 received in the semiconductor device receiving groove 121. In this case, the board temperature regulating portion 1425 is configured as an apparatus capable of supplying a heat transfer medium to each heat transfer path 355.

In the foregoing embodiments, the temperature of the semiconductor device may be controlled by heat conduction since the heat conductor 345 of the lid part 300 or the heat conductor 160 of the receiving part 100 makes direct contact with the semiconductor device 20 while the lid part 300 is attached. In contrast, in another embodiment illustrated in FIG. 7, the temperature of the semiconductor device 20 is regulated by heat convention using a heat transfer medium.

The following description will be given with respect to temperature regulating regions 150, for example, which are defined in a different manner from the those of the foregoing embodiment with reference to FIGS. 8 and 9.

Although, in the foregoing embodiment, each temperature regulating region 150 is defined in such a way as to include only one semiconductor device receiving groove 121, each temperature regulating region 150 does not necessarily include one semiconductor device receiving groove 121 but may include a plurality of semiconductor device receiving grooves 121. In this case, the second heat transfer end portion 342 of the heat transfer portion 340 may be exposed to the plurality of semiconductor device receiving grooves 121, and therefore each heat transfer portion 340 is able to regulate the temperatures of the plurality of semiconductor devices 20.

Figure 8:
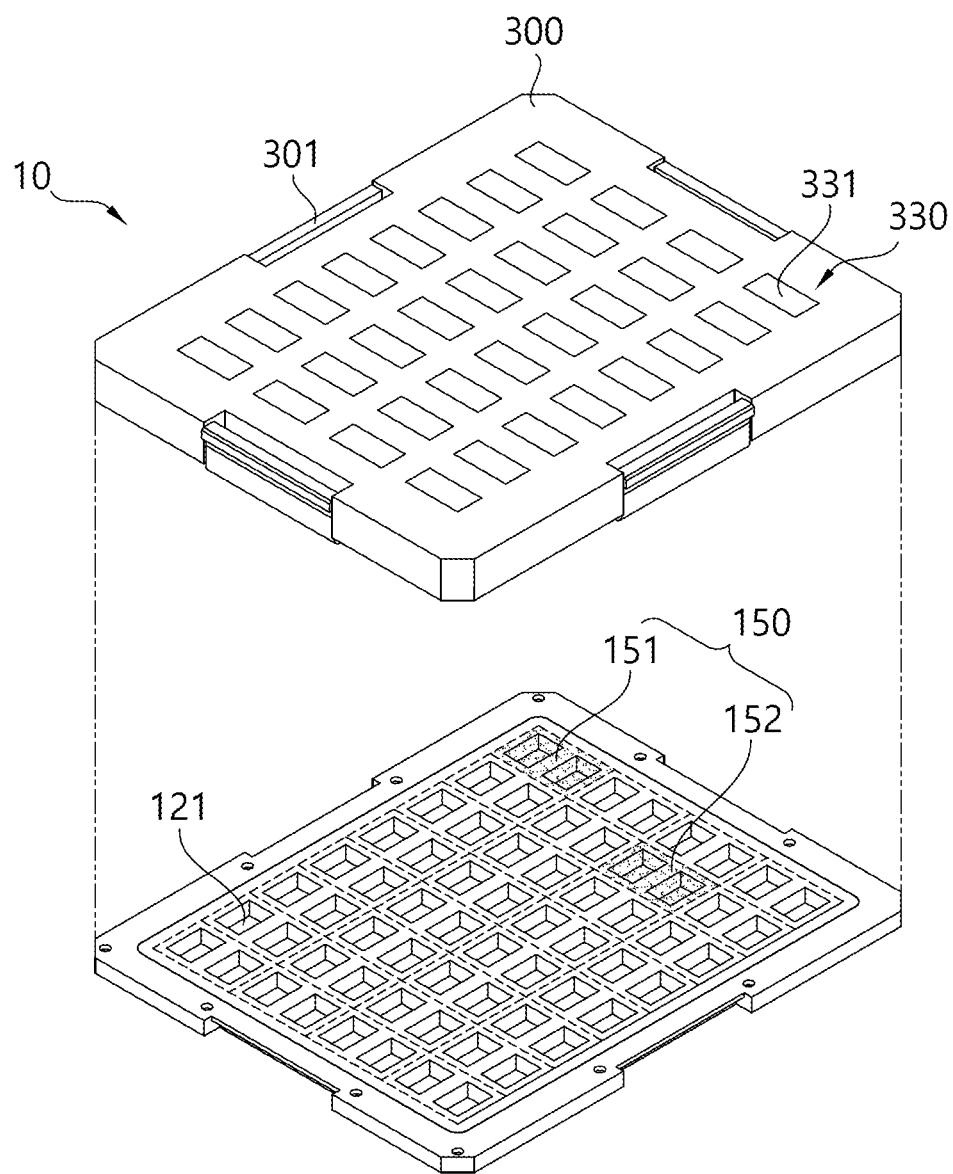
FIG. 8 is a perspective view illustrating a receiving part and a lid part according to another embodiment of the temperature regulating regions.
Figure 9:
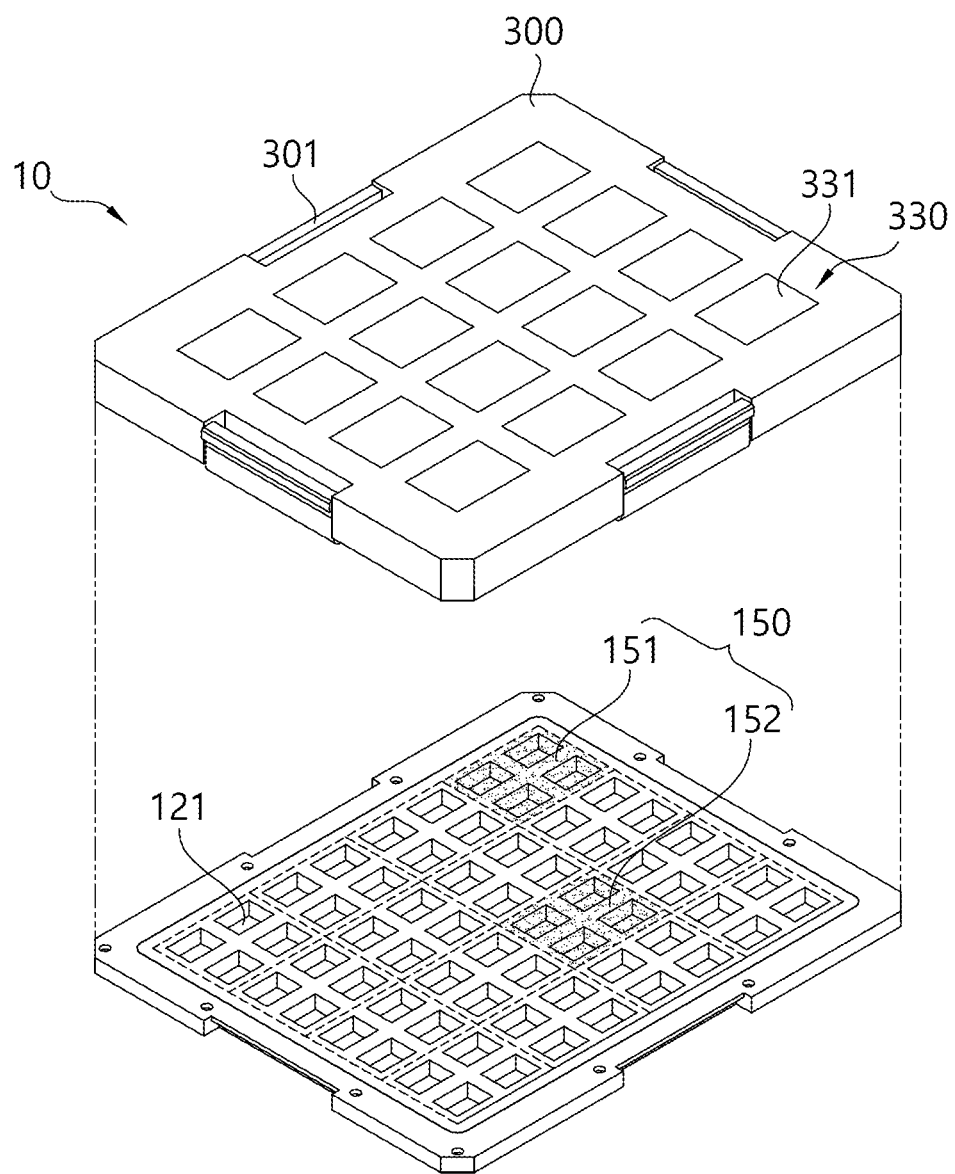
FIG. 9 is a perspective view illustrating a receiving part and a lid part according to another embodiment of the temperature regulating regions.

In the embodiment illustrated in FIG. 8, each temperature regulating region 150 is defined to include two semiconductor device receiving grooves 121, and each heat transfer portion 340 may control the temperatures of the two semiconductor devices 20. In the embodiment illustrated in FIG. 9, each temperature regulating region 150 is defined to include four semiconductor device receiving grooves 121, and each heat transfer portion 340 may control the temperatures of the four semiconductor devices 20. The method of defining the temperature regulating regions 150 is not limited the examples illustrated in FIGS. 8 and 9, and they may be defined in any way possible as long as the plurality of semiconductor devices 20 can be evenly heated.

Although several embodiments have been described above with respect to a test board of the present disclosure, the present disclosure is not limited to these embodiments. It should be appreciated that those having ordinary skill in the art may carry out the present disclosure by making various modifications or changes without departing from the scope of the technical features of the present disclosure as defined in the appended claims.

What is claimed is:

1. A test board for semiconductor devices which contains a plurality of semiconductor devices and is loaded into a testing apparatus, the test board comprising:
   a receiving part formed with a plurality of semiconductor device receiving grooves that respectively receive the plurality of semiconductor devices; and
   a lid part removably attached to the receiving part,
   wherein the lid part includes a heat transfer portion having a first heat transfer end portion, which is exposed on the outside of the lid part while the lid part is attached to the receiving part, and a second heat transfer end portion, which extends from the first heat transfer end portion and is exposed to a temperature regulating region defined to include at least one of the plurality of semiconductor device receiving grooves,
   wherein the heat transfer portion includes a heat conductor extending from the first heat transfer end portion to the second heat transfer end portion,
   wherein the receiving part includes a receiving part heat conductor that includes a lid part contact portion and a semiconductor device contact portion, the lid part contact portion at least partially coming into contact with the second heat transfer end portion while the lid part is attached to the receiving part, the semiconductor device contact portion coming into contact with a semiconductor device, whereby a temperature of the semiconductor device is regulated by heat conduction.

2. The test board of claim 1, wherein at least part of the second heat transfer end portion comes into contact with the semiconductor device received in the temperature regulating region while the lid part is attached to the receiving part, so as to regulate the temperature of the semiconductor device by heat conduction.

3. The test board of claim 2, wherein a plurality of temperature regulating regions are formed, and the plurality of temperature regulating regions include at least one inner temperature regulating region and a plurality of outer temperature regulating regions surrounding the inner temperature regulating region, and a plurality of heat conductors are formed corresponding to the plurality of temperature regulating regions, respectively.

4. The test board of claim 3, wherein the plurality of temperature regulating regions each include one semiconductor device receiving groove.

5. The test board of claim 3, wherein the length from the first heat transfer end portion to the second heat transfer end portion is shorter at the heat conductor corresponding to the outer temperature regulating region than at the heat conductor corresponding to the inner temperature regulating region.

6. The test board of claim 3, wherein a mean cross-sectional area from the first heat transfer end portion to the second heat transfer end portion is larger at the heat conductor corresponding to the outer temperature regulating region than at the heat conductor corresponding to the inner temperature regulating region.

7. The test board of claim 3, wherein the heat conductor corresponding to the outer temperature regulating region is formed of a material having higher thermal conductivity than that of the heat conductor corresponding to the inner temperature regulating region.

8. The test board of claim 3, wherein the heat conductor have a larger cross-sectional area at the second heat transfer end portion than at the first heat transfer end portion.

9. The test board of claim 2, further comprising a plurality of temperature sensors that measure the temperatures of the plurality of semiconductor devices, respectively, wherein a board temperature regulating portion comes into contact with the outside of the lid part and controls the temperatures of the plurality of semiconductor devices individually based on temperature measurements from the temperature sensors.

10. The test board of claim 1, wherein the heat transfer portion includes a heat transfer path extending from the first heat transfer end portion to the second heat transfer end portion, wherein the semiconductor device receiving groove in the temperature regulating region is supplied with a heat transfer material through the heat transfer path while the lid part is attached to the receiving part, so as to regulate the temperature of the semiconductor device by heat convection.

11. The test board of claim 10, further comprising a plurality of temperature sensors that measure the temperatures of the plurality of semiconductor devices, respectively, wherein a board temperature regulating portion comes into contact with the outside of the lid part and controls the temperatures of the plurality of semiconductor devices individually based on temperature measurements from the temperature sensors.

12. The test board of claim 1, further comprising a plurality of temperature sensors that measure the temperatures of the plurality of semiconductor devices, respectively, wherein a board temperature regulating portion comes into contact with the outside of the lid part and controls the temperatures of the plurality of semiconductor devices individually based on temperature measurements from the temperature sensors.

13. The test board of claim 1, wherein the lid part selectively presses at least part of the receiving part, and further includes a circuit portion which forms a circuit for electrically connecting the semiconductor devices and a tester, and which is selectively connected to the semiconductor devices in the receiving part while pressed state by the lid part.

14. The test board of claim 13, wherein the receiving part includes a pocket unit formed with the semiconductor device receiving groove and a socket base configured in such a way that the pocket unit is movable relative thereto, and when the lid part is attached to a top side of the receiving part, the lid part presses the pocket unit, and the position of the pocket unit is changed, whereby the semiconductor device received in the pocket unit is connected to the circuit portion.

15. The test board of claim 14, wherein the circuit portion includes a device contact terminal selectively connected to the semiconductor devices received in the receiving part, wherein, once the position of the pocket unit is changed by being pressed by the lid part, the device contact terminal is exposed to the inside of the pocket unit and electrically connected to the semiconductor device.

16. The test board of claim 14, wherein an elastic member is provided between the socket base and the pocket unit such that the pocket unit is elastically supported on the socket base.

* * * * *